United States Patent
Kikuchi et al.

(10) Patent No.: US 9,599,748 B2
(45) Date of Patent: Mar. 21, 2017

(54) MULTI-OPTICAL AXIS PHOTOELECTRIC SENSOR

(71) Applicant: OMRON Corporation, Kyoto-shi, Kyoto (JP)

(72) Inventors: Keisaku Kikuchi, Kusatsu (JP); Minoru Hashimoto, Ritto (JP); Kazunori Okamoto, Kusatsu (JP); Keitaku Kanemoto, Kyotanabe (JP)

(73) Assignee: OMRON CORPORATION, Kyoto-shi (JP)

( * ) Notice: Subject to any disclaimer, the term of this patent is extended or adjusted under 35 U.S.C. 154(b) by 53 days.

(21) Appl. No.: 14/811,914

(22) Filed: Jul. 29, 2015

(65) Prior Publication Data
US 2016/0041301 A1 Feb. 11, 2016

(30) Foreign Application Priority Data
Aug. 8, 2014 (JP) ................. 2014-162531

(51) Int. Cl.
*G01V 8/20* (2006.01)
*F16P 3/14* (2006.01)

(52) U.S. Cl.
CPC ............... *G01V 8/20* (2013.01); *F16P 3/144* (2013.01)

(58) Field of Classification Search
CPC .................. G01V 8/20; F16P 3/144
USPC ............................. 250/221, 201.1
See application file for complete search history.

(56) References Cited

U.S. PATENT DOCUMENTS

| 2003/0164447 | A1 | 9/2003 | Kudo et al. | |
| 2005/0211883 | A1* | 9/2005 | Lohmann | F16P 3/14 250/221 |
| 2013/0083330 | A1* | 4/2013 | Piana | G01V 8/20 356/614 |
| 2014/0091898 | A1* | 4/2014 | Burger | G05B 9/02 340/3.1 |
| 2015/0144772 | A1* | 5/2015 | Eble | G01V 8/20 250/208.2 |

FOREIGN PATENT DOCUMENTS

| EP | 1835310 A2 | 9/2007 |
| JP | H02-271199 A | 11/1990 |
| JP | 4481549 B2 | 3/2010 |

* cited by examiner

*Primary Examiner* — Seung C Sohn
(74) *Attorney, Agent, or Firm* — Mots Law, PLLC

(57) ABSTRACT

For a manufacturing machine that moves in and out of a detection area of a multi-optical axis photoelectric sensor, floating blanking and blanking monitoring are activated without outputting a stop signal to stop the manufacturing machine every when the manufacturing machine moves out of the detection area. A detection processing unit performs, when at least one of the plurality of optical axes is constantly interrupted by the object, floating blanking of outputting the detection signal upon determining that the number of optical axes in an interrupted state is greater than a preset maximum optical axis number, and blanking monitoring of outputting the detection signal upon determining that the number of optical axes in an interrupted state is smaller than a preset minimum optical axis number, and activates or deactivates the floating blanking and the blanking monitoring based on the signals received by the signal reception unit.

6 Claims, 5 Drawing Sheets

MULTI-OPTICAL AXIS PHOTOELECTRIC SENSOR

FIELD

The present invention relates to a multi-optical axis photoelectric sensor, and more particularly, to a multi-optical axis photoelectric sensor with floating blanking and blanking monitoring.

BACKGROUND

A typical multi-optical axis photoelectric sensor includes an emitter unit, which includes a plurality of emitter elements aligned linearly, and a receiver unit, which includes a plurality of receiver elements aligned linearly in one-to-one correspondence to the emitter elements. The emitter elements and the receiver elements are arranged to face each other and form a plurality of optical axes. The optical axes, which are linearly aligned with one another, together define a detection area that extends from one end to the other end.

The emitter unit lights its emitter elements. As the emitter elements illuminate, the receiver unit obtains light receiving signals from their receiver elements corresponding to the illuminating emitter elements, and determines the amount of light based on the signals. The receiver unit determines whether light from the emitter unit has been either received or interrupted based on the determined amount of received light.

The multi-optical axis photoelectric sensor is installed near the manufacturing machine, such as a press machine or a bending machine, to prevent workers from erroneously entering the area. When determining that any of the optical axes is interrupted, the multi-optical axis photoelectric sensor determines that a worker has entered an area around the manufacturing machine, and outputs a stop signal to the manufacturing machine. The output stop signal stops the manufacturing machine, and achieves the safety of workers.

The multi-optical axis photoelectric sensor provides safety function by immediately outputting a stop signal to stop the operation of the manufacturing machine upon detecting any optical axis interrupted in the detection area, independently of the number of such interrupted optical axes. However, when the system is in use, the manufacturing machine may interrupt a part of the detection area of the multi-optical axis photoelectric sensor. For this manufacturing machine, the multi-optical axis photoelectric sensor has blanking, which outputs no stop signal (or nullifies signal output) when the interrupted optical axes satisfy predetermined conditions.

In particular, when the manufacturing machine moves within the detection area, the position and the number of interrupted optical axes change in accordance with the movement of the manufacturing machine. To respond to this, the multi-optical axis photoelectric sensor has floating blanking, which outputs no stop signal when the number of optical axes interrupted simultaneously is not greater than the set number of optical axes.

Japanese Unexamined Patent Application Publication No. 2-271199 (Patent Literature 1) describes a photoelectric safety device for a machine tool as an example of a multi-optical axis photoelectric sensor known in the art. This safety device scans all the optical axes prior to machining, and stores optical axes for which light interruption has been detected in advance. When subsequently detecting light interruption of any of the optical axes excluding the optical axes that have been stored, the safety device determines that an object other than a preset light interrupting object has entered a dangerous area, and stops the machine tool.

Another multi-optical axis photoelectric safety device with floating blanking is described in Japanese Patent No. 4481549 (Patent Literature 2). This safety device sets floating blanking in a part of the detection area of a light curtain. In the area in which floating blanking is set, this safety device determines that the area is in an interrupted state when detecting a predetermined number of interrupted optical axes. In the other area, the safety device determines that the area is in an interrupted state when detecting at least one interrupted optical axis. The safety device then outputs a stop signal to the manufacturing machine.

CITATION LIST

Patent Literature

Patent Literature 1: Japanese Unexamined Patent Application Publication No. 2-271199
Patent Literature 2: Japanese Patent No. 4481549

SUMMARY

Technical Problem

The number of optical axes that are interrupted by a light interrupting object can decrease during use of floating blanking if an unexpected abnormality occurs in the light interrupting object (e.g., misalignment, damaged components, or disengagement of components). In this case, a human body entering the detection area will not stop the manufacturing machine when the number of interrupted optical axes is within the preset optical axis number. This degrades the safety of workers. When the blanking is being used, the safety device typically monitors changes in the number of interrupted optical axes to detect any other object, such as a human body, that has entered the area in place of the manufacturing machine. More specifically, the safety device with blanking monitoring determines that the detection area is in a dangerous state when any of the interrupted optical axes changes to a light-entering state and decreases the number of interrupted optical axes below the predetermined optical axis number during use of blanking. The safety device then outputs a stop signal for forcibly stopping the machine.

The safety standard IEC-61496-2 requires monitoring of the optical axes deactivated by blanking while the optical axes are interrupted. The deactivated optical axes are to be monitored during use of blanking while these optical axes remain interrupted. In other words, blanking monitoring is also to be activated during use of blanking to achieve safety.

However, floating blanking monitoring known in the art is intended for a manufacturing machine that moves within the detection area, and is not intended for a manufacturing machine that moves in and out of the detection area. When, for example, floating blanking monitoring is used for a robot that works in and out of the detection area, the robot can move out of the detection area while floating blanking monitoring is being activated in addition to floating blanking in the detection area. This causes all the optical axes that have been interrupted to be in a light-entering state. A stop signal is then output to the robot to stop the robot. The robot is to be restarted. After the robot is restarted, the floating blanking monitoring is to be activated again. If the robot stops every time when it moves out of the detection area and is then restarted, the robot will have low production efficiency. Blanking monitoring has thus been conventionally unusable when blanking is activated for a manufacturing machine that moves in and out of the detection area.

In this case, the robot will operate without the blanking monitoring being activated. A human body entering the area, in place of the robot, cannot be detected during blanking. This can degrade the safety of workers. Safety devices may need to monitor light interruption caused by a manufacturing machine that operates in and out of the detection area.

The present invention is directed to a multi-optical axis photoelectric sensor that activates floating blanking and blanking monitoring at the same time for a manufacturing machine that moves in and out of a detection area without outputting a stop signal to stop the manufacturing machine every time when the manufacturing machine moves out of the detection area.

Solution to Problem

One aspect of the present invention provides a multi-optical axis photoelectric sensor including an emitter unit, a receiver unit, a detection processing unit, and a signal reception unit. The emitter unit includes a plurality of emitter elements that are aligned linearly. The receiver unit includes a plurality of receiver elements that are arranged to face the respective emitter elements. The detection processing unit determines, in a detection area including a plurality of optical axes formed between the plurality of emitter elements and the plurality of receiver elements, whether each of the optical axes is in an interrupted state after optical axis selection corresponding to one scan, and outputs a detection signal based on a result of the determination. The signal reception unit receives a first signal immediately before a machine that is movable within the detection area enters the detection area, and receives a second signal immediately before the machine moves out of the detection area. The detection processing unit performs floating blanking of outputting the detection signal upon determining that the number of optical axes in an interrupted state is greater than a preset maximum optical axis number when at least one of the plurality of optical axes is constantly interrupted by the machine, and performs blanking monitoring of outputting the detection signal upon determining that the number of optical axes in an interrupted state is smaller than a preset minimum optical axis number when at least one of the plurality of optical axes is constantly interrupted by the machine. The detection processing unit activates or deactivates the floating blanking and the blanking monitoring based on the first signal and the second signal received by the signal reception unit.

In some embodiments, the detection processing unit activates the floating blanking when receiving the first signal, and activates the blanking monitoring when determining that the number of optical axes in an interrupted state is not less than the minimum optical axis number after the floating blanking is activated, deactivates the blanking monitoring after receiving the second signal, and further deactivates the floating blanking when determining that all the optical axes are in a light-entering state after receiving the second signal.

In some embodiments, the detection processing unit constantly activates the floating blanking, and activates the blanking monitoring when determining that the number of optical axes in an interrupted state is not less than the minimum optical axis number after receiving the first signal, and deactivates the blanking monitoring after receiving the second signal.

In some embodiments, the detection processing unit constantly activates the floating blanking, and sets the blanking monitoring after receiving the first signal, and further deactivates the blanking monitoring when receiving the second signal after receiving the first signal.

Advantageous Effects

One or more embodiments of the present invention allow blanking monitoring to remain activated for a manufacturing machine that is partially movable in and out of a detection area and allows blanking to continue while maintaining the safety of the system.

DETAILED DESCRIPTION

Figure 1:
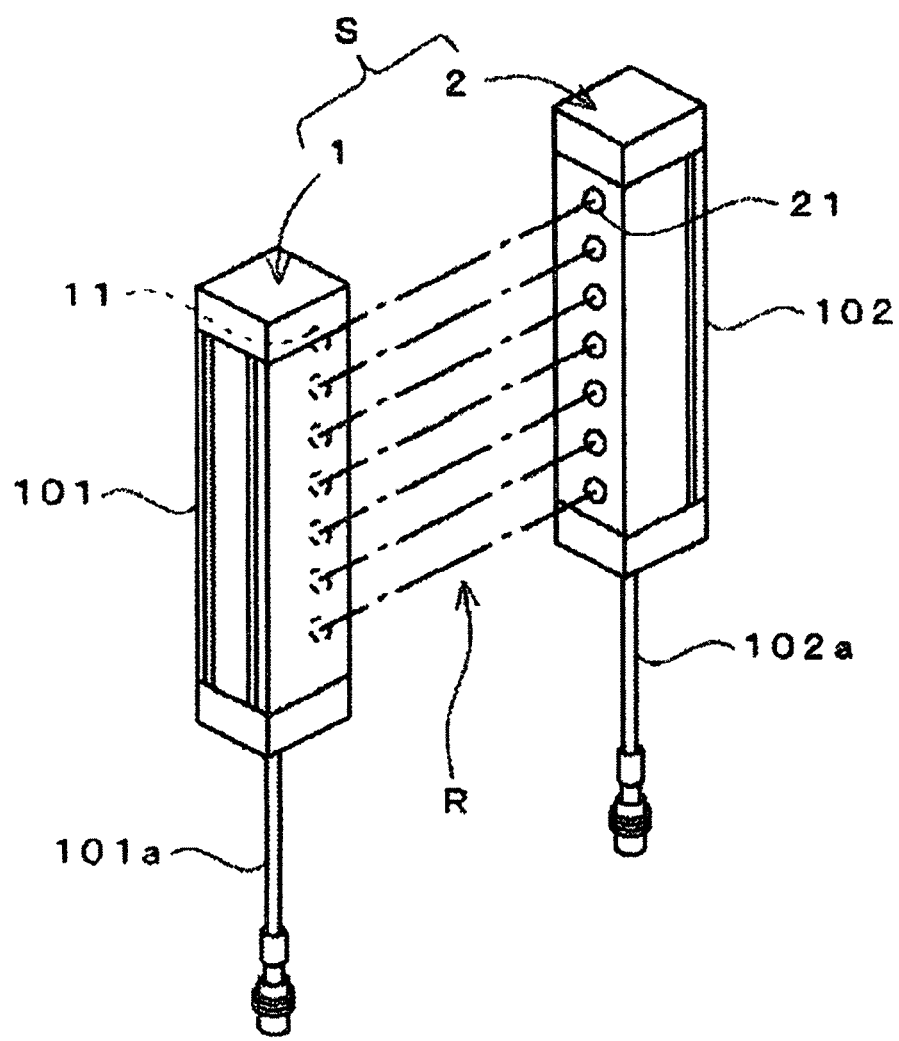
FIG. 1 is a diagram showing the appearance of a multi-optical axis photoelectric sensor according to one embodiment of the present invention.

Embodiments of the present invention will now be described in detail with reference to the drawings. In the drawings, the same reference numerals indicate the same or the corresponding components.

FIG. 1 shows the appearance of a multi-optical axis photoelectric sensor according to one embodiment of the present invention. A multi-optical axis photoelectric sensor S according to the present embodiment includes a pair of an emitter (emitter unit) 1 and a receiver (receiver unit) 2. The emitter 1 includes emitter elements 11, and a housing 101 accommodating the emitter elements 11 and a control board. Similarly, the receiver 2 includes receiver elements 21, and a housing 102 accommodating the receiver elements 21 and a control board. Cables 101a and 102a extend from the bottoms of the respective housings 101 and 102.

Each of the housings 101 and 102 has a window on its front face to allow light to pass through. The emitter elements 11 are arranged with their light emitting surfaces facing the window, and are aligned linearly in the longitudinal direction of the housing 101. The receiver elements 21 are arranged with their light receiving surfaces facing the window, and are aligned linearly in the longitudinal direction of the housing 102. The emitter 1 and the receiver 2 are arranged to face each other in one-to-one correspondence at a predetermined gap between them, and define a detection area R formed by a plurality of optical axes between them.

The cables 101a and 102a for the emitter 1 and the receiver 2 each include a plurality of signal lines including communication lines. These signal lines are branched using extension cords connected to the cables 101a and 102a, to which communication lines are connected with, for example, connecting cords or connectors. Other signal lines include power lines and output lines shown in FIG. 2, as well as signal lines for inputting the settings (not shown).

The communication cables 101a and 102a are connected to a communicator unit 4 via a branch connector 3. The communicator unit 4 is connected to the branch connector 3 and a personal computer 5.

Figure 2:
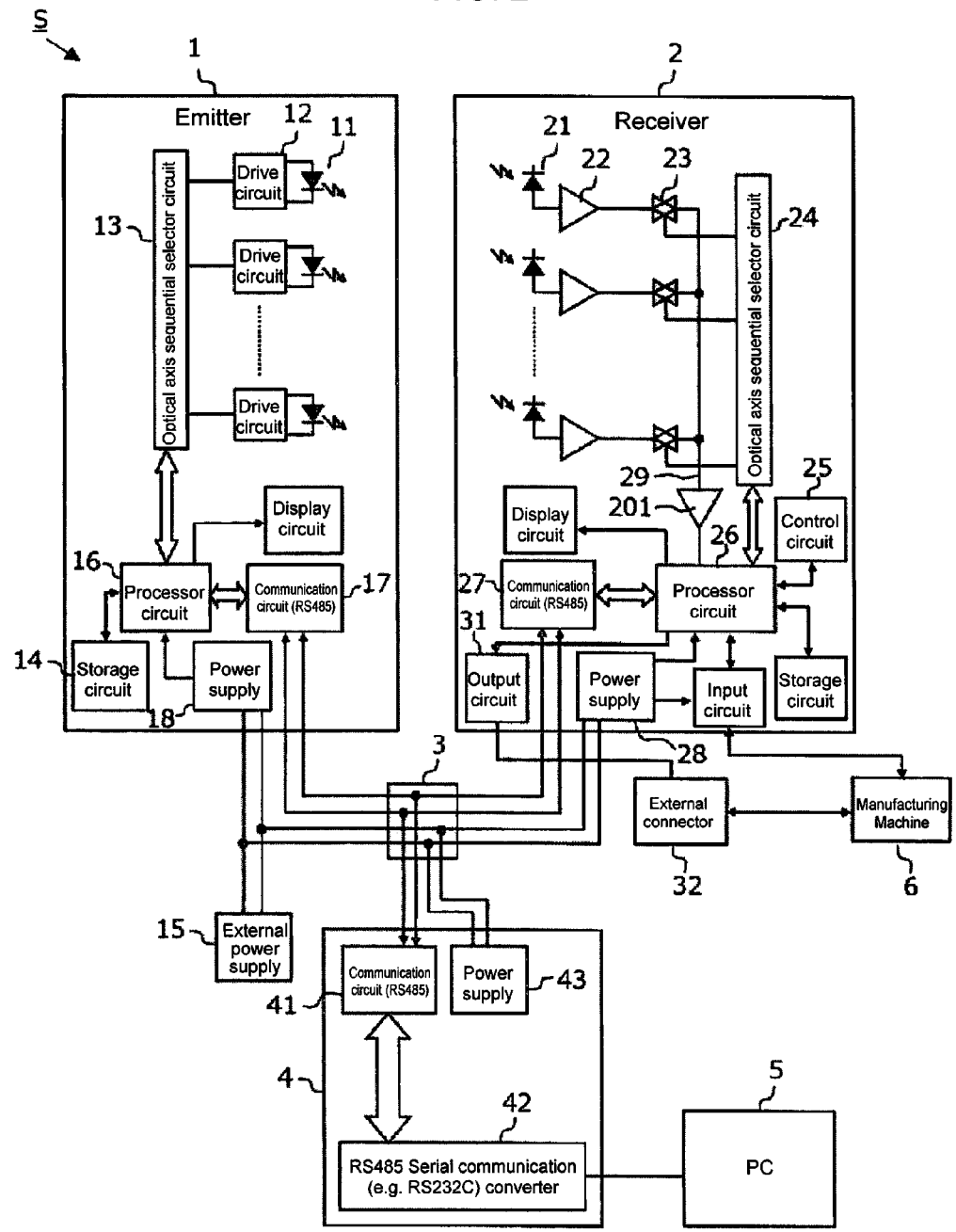
FIG. 2 is a schematic diagram showing the structure of a system including the multi-optical axis photoelectric sensor according to the embodiment.

FIG. 2 shows the main circuit configuration of the sensor S. The emitter 1 includes the emitter elements 11, which are for example light-emitting diodes, drive circuits 12 for separately driving the emitter elements 11, an optical axis sequential selector circuit 13, a storage circuit 14, a processor circuit 16, a communication circuit 17, and a power supply 18. Each of the emitter elements 11 is connected to the processor circuit 16 via the corresponding drive circuit 12 and the optical axis sequential selector circuit 13.

The optical axis sequential selector circuit 13 sequentially connects the drive circuit 12 for each emitter element 11 to the processor circuit 16. An optical axis sequential selector circuit 24 sequentially connects an amplifier 22 and a switch 23 corresponding to each receiver element 21 to a processor circuit 26.

The receiver 2 includes the receiver elements 21, which are for example photodiodes, amplifiers 22 and analog switches 23 corresponding to the receiver elements 21, the optical axis sequential selector circuit 24, a control circuit 25, the processor circuit 26, a communication circuit 27, a power supply 28, and an output circuit 31. An amplifier circuit 201 and an analog to digital (ND) converter circuit are arranged on a transmission line 29 extending from each of the analog switches 23 to the control circuit 25.

The power supplies 18 and 28 in the emitter 1 and the receiver 2 are connected to a common external power supply (direct current power supply) 15. Communication circuits 17 and 27 are connected to each other. Two output lines for outputting a detection signal extend from the output circuit 31 in the receiver 2.

These output lines are connected to the power supply of a machine installed in the dangerous area.

The multi-optical axis photoelectric sensor S outputs a detection signal to a power supply of the machine installed in the dangerous area, such as a manufacturing machine. The multi-optical axis photoelectric sensor S outputs a logical high (H) level signal. When the detection area is at least partially interrupted, the multi-optical axis photoelectric sensor S stops outputting a signal. More specifically, the detection signal switches from a H (logical high) level to a L (logical low) level.

Each of the processor circuits 16 and 26 may be a microcomputer including a central processing unit (CPU) and a memory. The processor circuits 16 and 26 compare the amount of received light at predetermined timing with a predetermined threshold to determine whether each optical axis is in a light-entering state or an interrupted state. The processor circuits 16 and 26 combine the determination results for these optical axes every after optical axis selection corresponding to one cycle, and determine the occurrence of light interruption of the entire detection area R. The processor circuit 16 can set the detection area as a floating blanking area. Under the blanking being activated, the processor circuit 16 determines whether the number of interrupted optical axes is greater than a preset optical axis number to determine whether a signal is to be output.

The control circuit 25 receives the determination result indicating either a light-entering state or an interrupted state obtained by the processor circuit 26, and outputs a stop signal from the output circuit 31 to a manufacturing machine 6 in accordance with the determination result. The communication circuits 17 and 27 are communication interfaces complying with RS-485. The communication circuits 17 and 27 control transmission and reception of signals between the emitter 1 and the receiver 2.

The storage circuits 14 and 29 each store programs and parameters used for the processing performed by the processor circuits 16 and 26 arranged in the respective housings, and setting information associated with floating blanking.

With an external connector terminal 32, the output circuit 31 is connected to a switch mechanism (not shown) incorporated in the power supply for supplying power to the manufacturing machine 6. When an output signal from the output circuit 31 indicates a H level, the switch mechanism is closed to supply power to the manufacturing machine 6. When an output signal from the output circuit 31 indicates a L level, the switch mechanism is open to stop the manufacturing machine 6.

The power supplies 18 and 28 receive power from the common external power supply 15 (direct current power supply), and supply power to the emitter 1 and the receiver 2, respectively.

The branch connector 3 branches a communication line and a power line arranged between the emitter 1 and the receiver 2. Its dedicated cord contains the branched communication line or power line. The dedicated cord is connected to the communicator unit 4. The communicator unit 4 is connected to the personal computer 5.

The communicator unit 4 includes a communication circuit 41, which can perform data communication with the emitter 1 and the receiver 2, a power supply 43, and a communication converter 42. The communication circuit 41 is an interface complying with RS-485. The power supply 43 receives power from the external power supply 15 via the branch connector 3, and supplies power to the components of the communicator unit 4. The communication converter 42 serially converts a signal complying with RS-485, and outputs the resulting signal complying with, for example, RS-232C or USB (Universal Serial Bus).

The communication converter 42 receives information about the optical axes of the multi-optical axis photoelectric sensor that performs blanking from the personal computer 5, and transmits the information to the receiver 2 via the communication circuit 41.

The optical axis sequential selector circuit 13 and the optical axis sequential selector circuit 24 are synchronized with each other to allow the emitter elements 11 to illuminate sequentially, and allow the receiver elements 21 to sequentially output light receiving signals. The processor circuits 16 and 26 use the communication circuits 17 and 27 to synchronize signals for controlling the operation of the emitter elements 11 and the receiver elements 21.

As described above, the emitter 1 and the receiver 2 are synchronized through communication performed with communication cables 101a and 102a.

Alternatively, the emitter 1 and the receiver 2 may be synchronized with each other with optical communication.

The personal computer 5 displays, for example, data received through, for example, the communicator unit 4. The personal computer 5 may display various parameters to be used in the multi-optical axis photoelectric sensor S. For example, the user can freely set the values used for floating blanking and blanking monitoring by using the personal computer 5. When the user sets the values for floating blanking and blanking monitoring by using the personal computer 5, the input information can be stored into the storage circuit 29 via the communication circuit 41.

In the present embodiment, the multi-optical axis photoelectric sensor S includes a detection processing unit that determines the occurrence of light interruption of the entire detection area R every after optical axis selection corresponding to one cycle (one scan) in the multi-optical axis photoelectric sensor S, and outputs a detection signal indicating the determination result. More specifically, the detection processing unit determines whether each optical axis is in an interrupted state every after optical axis selection corresponding to one scan, and combines the determination results for these optical axes and determines the occurrence of light interruption of the entire detection area R. When the detection area R is not interrupted, the detection processing unit outputs a signal indicating a non-detected state. When the detection area R is at least partially interrupted, the detection processing unit outputs a signal indicating a detected state.

When at least one of the optical axes is constantly interrupted by a specific object, for example, a driving target 60 that is movable in the detection area R, the floating blanking is activated. When the floating blanking is activated, the detection processing unit nullifies the determination results for light interruption of the at least one optical axis interrupted by the driving target 60. More specifically, the detection processing unit outputs a signal indicating a detected state when the number of optical axes that are determined interrupted is greater than a preset maximum optical axis number. The detection processing unit also outputs a signal indicating a detected state when the number of optical axes that are determined interrupted is smaller than a preset minimum optical axis number. The maximum optical axis number and the minimum optical axis number are the setting values for floating blanking and blanking monitoring.

The detection processing unit included in the multi-optical axis photoelectric sensor S may be the processor circuit 26 included in the receiver 2, the processor circuit 16 included in the emitter 1, or the personal computer 5.

The multi-optical axis photoelectric sensor S performs an object detection process as described below. First, light emission and reception is performed between the emitter 1 and the receiver 2. In this light emission and reception process, the processor circuit 16 generates a timing signal for generating a signal beam at every predetermined time, and provides the signal to the optical axis sequential selector circuit 13. The optical axis sequential selector circuit 13 sequentially connects the drive circuit 12 corresponding to each emitter element 11 to the processor circuit 16. As a result, the processor circuit 16 sequentially outputs a timing signal to each drive circuit 12. This achieves the sequential illumination of the emitter elements 11. The timing signal is further provided to the processor circuit 26 included in the receiver 2 through the communication circuits 17 and 27.

In the receiver 2, an output of light reception from each receiver element 21 is transmitted to the processor circuit 26 through the amplifier 22 and the switch 23. The processor circuit 26 transmits a timing signal from the emitter 1 to the optical axis sequential selector circuit 24 to sequentially turn on the switch 23 associated with each optical axis, and receives an output of light reception from the receiver element 21 corresponding to the emitter element 11 that has emitted a signal beam. The processor circuit 26 then compares the light receiving output from each receiver element 21 with a predetermined threshold to determine whether the corresponding optical axis is in an interrupted state. Upon completing the reception of light receiving outputs for all the optical axes, the processor circuit 26 combines the determination results for the optical axes to obtain a final determination result, and generates a detection signal indicating the determination result and outputs the generated detection signal from the output circuit 31 to an external device as a stop signal.

Under the floating blanking being activated, the detection processing unit determines the maximum optical axis number, which is the number of optical axes to be nullified, in advance in accordance with the size and the position of the object in the detection area R. When the obtained determination result indicating the number of interrupted optical axes is not more than the maximum optical axis number, the detection processing unit nullifies these interrupted optical axes.

The multi-optical axis photoelectric sensor S further includes blanking monitoring to monitor the presence of a specific object during use of floating blanking. In detail, under the floating blanking remaining activated after the specific object moves out of the detection area R, the multi-optical axis photoelectric sensor S may fail to detect another object (e.g., a human body) entering the detection area R if the number of optical axes interrupted by the other object is not more than the maximum optical axis number. To avoid this, when the number of optical axes interrupted by the other object is smaller than the preset minimum optical axis number, the multi-optical axis photoelectric sensor S determines that the floating blanking has an abnormality under the floating blanking being activated. In this case, the multi-optical axis photoelectric sensor S generates a detection signal and outputs the generated detection signal from the output circuit 31 to forcibly stop the operation of the machine. In some embodiments, the detection processing unit outputs a signal indicating a detected state when the floating blanking is deactivated to partially interrupt the detection area R.

Figure 3:
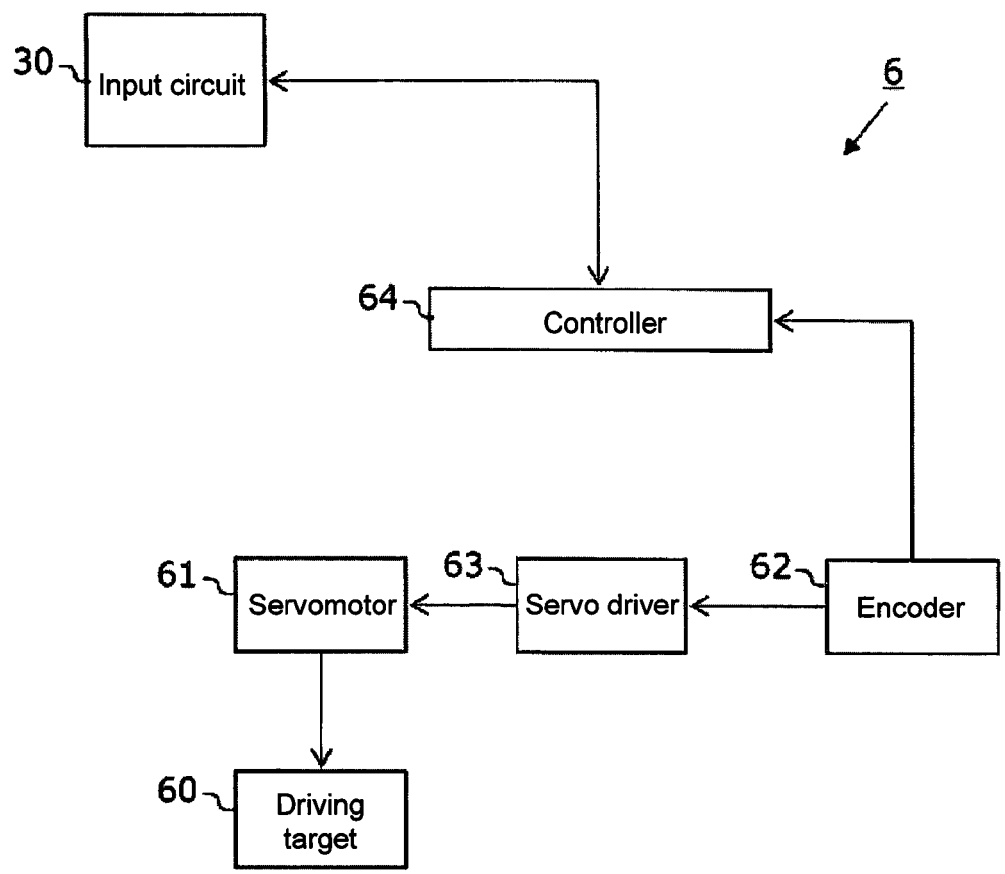
FIG. 3 is a functional block diagram of a manufacturing machine according to the embodiment.

FIG. 3 is a functional block diagram of the manufacturing machine 6 according to the embodiment of the present invention. The manufacturing machine 6 is, for example, a robot. The manufacturing machine 6 includes the driving target 60, a servomotor 61, an encoder 62, a servo driver 63, and a controller 64. The driving target 60 is, for example, a robot arm.

The servomotor 61 is, for example, an AC servomotor. The encoder 62 is directly connected to the servomotor 61. The encoder 62 is also connected to the driving target 60, which is driven by the servomotor 61. The revolution of the encoder is expressed as an encoder count value, which is the counted number per revolution of the encoder multiplied by the number of revolutions of the encoder. The encoder 62 transmits the encoder count value to the servo driver 63 as positional data. The servo driver 63 receives the encoder count value from the encoder to obtain the positional data of the driving target 60, which is driven by the servomotor 61.

The servo driver 63 receives a command signal from the controller 64 and the encoder count value output from the encoder 62. The servo driver 63 drives the servomotor 61 based on the command signal received from the controller 64 and the encoder count value output from the encoder 62.

The servo driver 63 controls power and the frequency to be provided to the servomotor 61 based on the command output from the controller 64 to allow the servomotor 61 to operate in accordance with the the command value provided from the controller 64.

The controller 64 is, for example, a programmable logic controller (PLC) or a position controller. The controller 64 outputs an operation command signal for controlling the operation of the servomotor 61, or for example, providing positioning control, velocity control, and torque control.

The controller 64 monitors the operation of the components of the machine driven by the servomotor 61 based on the encoder count value of the encoder 62, or more specifically monitors the position and the velocity of such components,. While monitoring, the controller 64 outputs an on-signal or an off-signal to the input circuit 30 in accordance with the monitoring results. For example, the controller 64 reads the encoder count value obtained by the encoder 62, and outputs an off-signal to the input circuit 30 when the counter value indicates an off-setting corresponding to the position of the driving target 60 near the multi-optical axis photoelectric sensor S. When the encoder count value indicates an on-setting corresponding to the position of the driving target 60 that is immediately before moving out of the detection area R after entering the detection area R, the controller 64 outputs an on-signal to the input circuit 30. The signal control is not limited to this example. The controller 64 outputs an off-signal at any set timing before the driving target 60 interrupts the detection area R, and outputs an on-signal at any set timing before the driving target 60 that has entered the detection area R moves out of the detection area R.

Instead of the controller 64, a sensor installed near the multi-optical axis photoelectric sensor S may be used to detect the moving direction of the driving target 60. For example, an area sensor is installed in, for example, the area in which the driving target 60 is movable, and is connected to the input circuit 30. When detecting the driving target 60 approaching the multi-optical axis photoelectric sensor S, the area sensor outputs an off-signal to the input circuit 30. The processor circuit 26 can determine that the driving target 60 is approaching using the off-signal from the controller 64 and/or the off-signal from the area sensor, and switch between activation and deactivation of the blanking.

Figure 4:
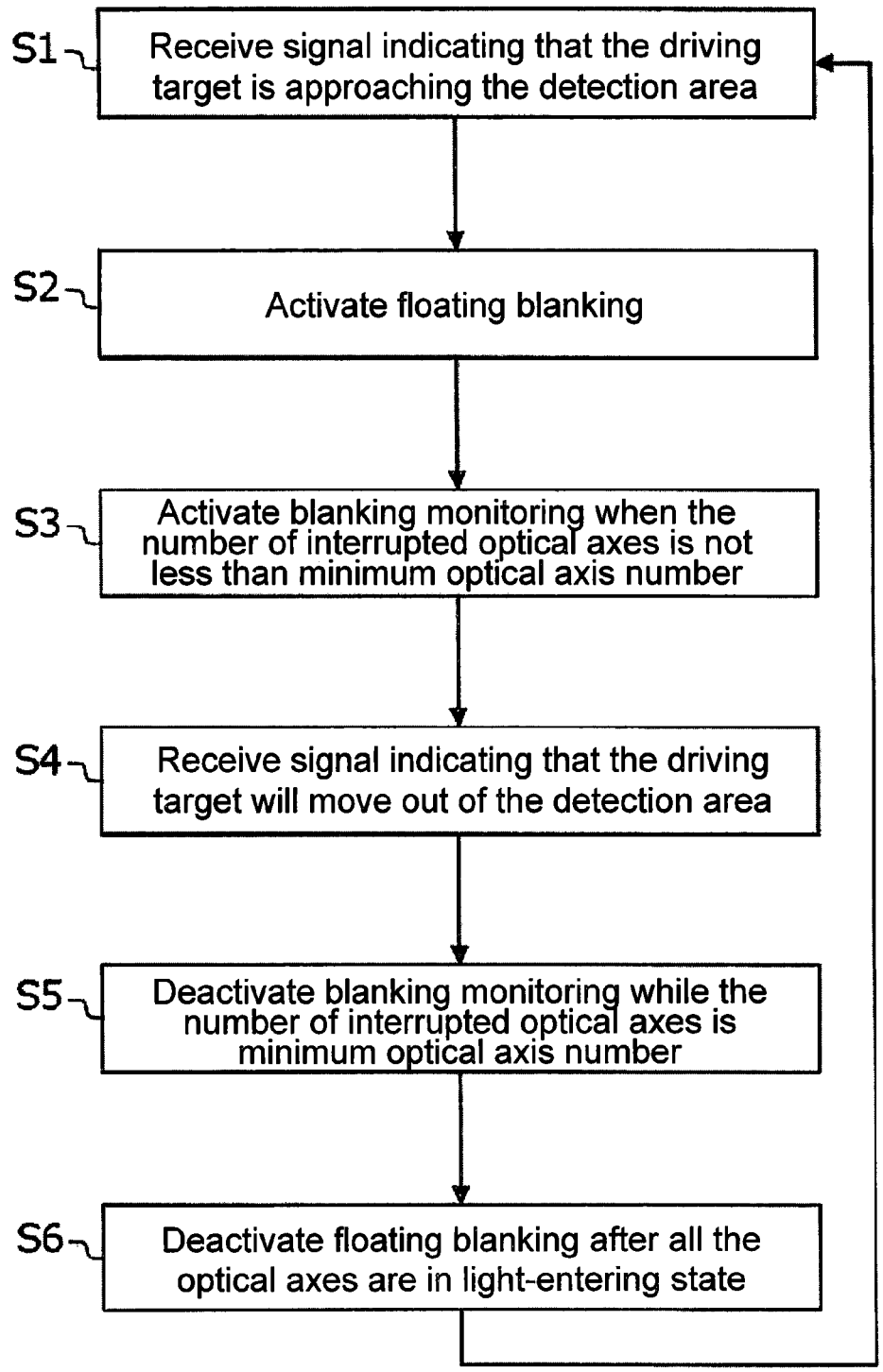
FIG. 4 is a flowchart showing an operation performed by the multi-optical axis photoelectric sensor according to the embodiment.

FIG. 4 is a flowchart showing the operation performed by the multi-optical axis photoelectric sensor S according to the embodiment of the present invention.

In step S1, the controller 64 outputs an off-signal indicating that the driving target 60 will enter the detection area R before the driving target 60 enters the detection area R. The input circuit 30 receives the off-signal.

In step S2, the processor circuit 26 activates floating blanking when receiving the off-signal from the controller 64. The transmission timing of the off-signal from the controller 64 is set to allow the processor circuit 26 to activate floating blanking in a reliable manner before the driving target 60 actually enters the detection area R. The setting includes the transmission time of the off-signal from the controller 64 to the input circuit 30, the transmission time of the off-signal from the input circuit 30 to the processor circuit 26, and the response time taken by the processor circuit 26. This prevents a stop signal from being output due to one or more optical axes interrupted by the driving target 60 entering the detection area before the floating blanking is activated.

In step S3, the processor circuit 26 activates blanking monitoring when determining that the number of interrupted optical axes is not less than the minimum optical axis number. The blanking monitoring monitors the number of interrupted optical axes. When the number of interrupted optical axes is smaller than the minimum optical axis number, a stop signal is output. If the blanking monitoring is activated during the entering process of the driving target 60 into the detection area R, the number of interrupted optical axes may be determined smaller than the minimum optical axis number, and a stop signal may be immediately output. This stops the manufacturing machine 6. To avoid this, the blanking monitoring is activated when the number of interrupted optical axes is determined not less than the minimum optical axis number. The number of interrupted optical axes not less than the minimum optical axis number indicates that the driving target 60 has completely entered the detection area R.

In step S4, the controller 64 transmits an on-signal indicating that the driving target 60 that has entered the detection area R will move out of the detection area R to the input circuit 30. The input circuit 30 receives the on-signal.

Subsequently, in step S5, the blanking monitoring is deactivated. If the driving target 60 moves out of the detection area under the blanking monitoring being activated, the number of interrupted optical axes decreases below the minimum optical axis number, and a stop signal is output. To avoid this, the blanking monitoring is to be deactivated while the driving target 60 remains within the detection area, or in other words while the number of interrupted optical axes remains not less than the minimum optical axis number. To achieve this, the transmission timing of the on-signal from the controller 64 is set to allow the processor circuit 26 to deactivate blanking monitoring in a reliable manner while the driving target 60 remains within the detection area R. The setting includes the transmission time from the controller 64 to the input circuit 30 and the response time taken by the processor circuit 26.

In step S6, the processor circuit 26 deactivates the floating blanking when all the optical axes are in a light-entering state. When the floating blanking is deactivated while the driving target 60 remains within the detection area R, an interrupted optical axis is detected immediately, and a stop signal is output. The processor circuit 26 deactivates the floating blanking after determining that the driving target 60 is outside the detection area R, or in other words, after determining that all the optical axes are in a light-entering state.

Under the floating blanking, light interruption detected for the number of optical axes not more than the number of optical axes set for floating blanking is permitted. Such light interruption does not stop the manufacturing machine 6.

More specifically, the processor circuit 26 compares the number of optical axes set for blanking with the number of actually interrupted optical axes. When the detected number of interrupted optical axes is not more than the set number of optical axes, the processor circuit 26 outputs no stop signal. In other words, when detecting light interruption for the number of interrupted optical axes not more than the set number of optical axes, the processor circuit 26 determines that the light interruption is caused by the driving target 60 permitted in advance. In this case, the processor circuit 26 outputs no stop signal and allows the manufacturing machine 6 to continue its operation.

When the detected number of interrupted optical axes is greater than the set number of optical axes, the processor circuit 26 determines that the light interruption is caused by a light interrupting object other than the driving target 60. The output circuit 31 outputs a stop signal to stop the manufacturing machine 6. This allows the manufacturing machine 6 to operate without being stopped by the floating blanking when light interruption is caused by an object permitted in advance, and stops the manufacturing machine 6 when light interruption is caused by a light interrupting object other than the object permitted in advance.

Activating the floating blanking alone allows a humanto enter the area in place of the driving target 60 when the number of interrupted optical axes is not more than the number of optical axes set for the floating blanking. This can degrade the safety when, for example, the driving target 60 has an abnormality. The light interruption is to be monitored to prevent a human from entering the area in place of the driving target 60. In this embodiment, the processor circuit 26 monitors whether the interrupted optical axes change to a light-entering state while a light interrupting object remains within the detection area R during use of the blanking monitoring. More specifically, the processor circuit 26 monitors whether the number of interrupted optical axes decreases based on the light receiving state of each receiver element 21 during use of the floating blanking. When the number of interrupted optical axes decreases, the output circuit 31 outputs a stop signal to stop the manufacturing machine 6.

The multi-optical axis photoelectric sensor S determines that the driving target 60 has entered the detection area R and the driving target 60 has moved out of the detection area R based on an input signal from the controller 64. When determining that the driving target 60 is moving toward the detection area R based on the operation of the components of the machine driven by the servomotor 61, the controller 64 outputs an on-signal before the driving target 60 approaching the detection area R actually enters the area. When determining that the driving target 60 is moving out of the detection area R, the controller 64 outputs an off-signal to the multi-optical axis photoelectric sensor S before the driving target 60 actually moves out of the detection area R. The multi-optical axis photoelectric sensor S performs the processes described above based on the received signals.

When the input circuit 30 receives the off-signal, the blanking is activated. When one or more optical axes are subsequently determined to be interrupted in the detection area R, the blanking monitoring is activated.

The processor circuit 26 determines whether the driving target 60 is moving out of the detection area R based on whether it has received an on-signal from the input circuit 30. As described above, the controller 64 detects the timing immediately before the driving target 60 moves out of the detection area R and inputs an on-signal into the input circuit 30. When an on-signal is detected as its input signal, the blanking monitoring is deactivated in step S4.

The processor circuit 26 determines whether the driving target 60 is actually inside or outside the detection area R by determining whether one or more optical axes are interrupted in the detection area R. The processor circuit 26 deactivates the floating blanking after determining that all the optical axes are in a light receiving state. The user may preset the time taken by the driving target 60 to move out of the detection area R after entering the detection area R. In this case, the processor circuit 26 deactivates the floating blanking upon detecting that the preset time has passed after the driving target 60 enters the detection area R.

Figure 5:
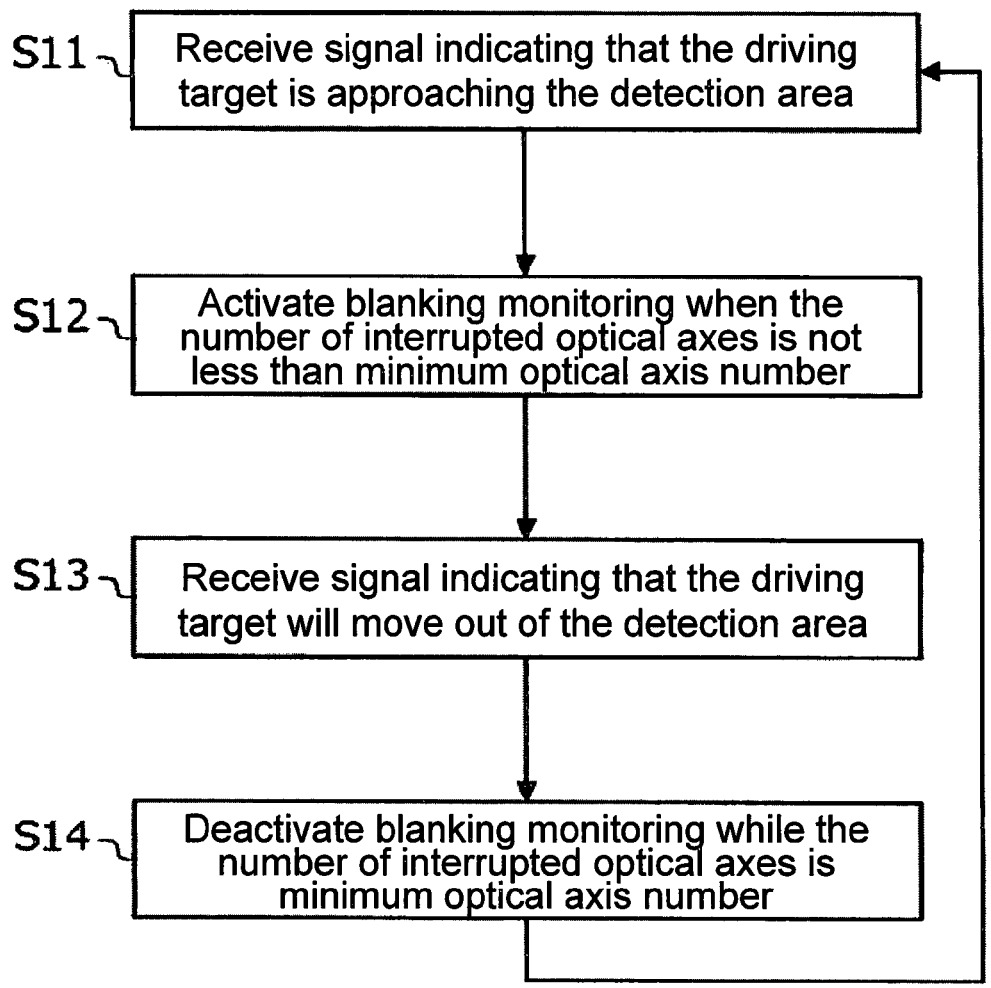
FIG. 5 is a flowchart showing the operation performed by the multi-optical axis photoelectric sensor according to the embodiment.

In other embodiments, only the blanking monitoring is switched between activation and deactivation in response to the movement into or out of the detection area R. FIG. 5 is a flowchart showing the operation. In this embodiment, the multi-optical axis photoelectric sensor S is first activated, and then the floating blanking is also activated.

In step S11, the multi-optical axis photoelectric sensor S receives an off-signal indicating that the driving target 60 is moving toward the detection area R from the controller 64. At this moment, the driving target 60 has yet to enter the detection area R, and no optical axis is interrupted.

In step S12, when the multi-optical axis photoelectric sensor S detects that the number of interrupted optical axes is not less than the minimum optical axis number after receiving the off-signal from the controller 64, the processor circuit 26 activates the blanking monitoring. To prevent the blanking monitoring from being activated during the entering process of the driving target 60 into the detection area R and prevent a stop signal from being output, the processor circuit 26 activates the blanking monitoring when the number of interrupted optical axes is not less than the minimum optical axis number, or in other words when determining that the driving target 60 has completely entered the detection area R in the same manner as shown in step S3 described above.

In step S13, the multi-optical axis photoelectric sensor S receives, from the controller 64, the on-signal indicating that the driving target 60 that has entered the detection area is moving out of the detection area R.

In step S14, the processor circuit 26 deactivates the blanking monitoring. In the same manner as shown in step S5 described above, the transmission timing of the on-signal output from the controller 64 is set to allow the processor circuit 26 to deactivate the blanking monitoring in a reliable manner while the driving target 60 remains within the detection area R, or more specifically while the number of interrupted optical axes remains not less than the minimum optical axis number to prevent a stop signal from being output.

In the present embodiment, only the blanking monitoring is switched between activation and deactivation in response to the movement of the driving target 60 into and out of the detection area R, while the floating blanking is constantly activated. The blanking monitoring can be deactivated before the driving target 60 moves out of the detection area R. In this case, when the driving target 60 moves out of the detection area R and the interrupted optical axes change to a light-entering state, the output circuit 31 is prevented from outputting a stop signal to stop the manufacturing machine 6. When the driving target 60 enters the detection area R, the blanking monitoring can be activated again. This allows monitoring of the interrupted state of the optical axes while the driving target 60 is interrupting one or more optical axes in the detection area R.

The embodiments disclosed herein are only illustrative in all respects and should not be construed to be restrictive. The scope of the invention is designated by the appended claims, and it is intended that all changes are contained in the claims and equivalent meanings and ranges.

REFERENCE SIGNS LIST 1 emitter
2 receiver
3 branch connector
4 communicator unit
5 personal computer
6 manufacturing machine
11 emitter element
12 drive circuit
13, 24 optical axis sequential selector circuit
14, 29, 38 storage circuit
15 common external power supply
16, 26 processor circuit
17, 27, 41 communication circuit
18, 28, 43 power supply
30 input circuit
21 receiver element
22, 24 amplifier
23 switch
25 control circuit
29 transmission line
31 output circuit
32 external connector terminal
42 communication converter 60 driving target
61 servomotor
62 encoder
63 servo driver
64 controller
101a communication cable
102a communication cable
R detection area
S multi-optical axis photoelectric sensor

The invention claimed is:

1. A multi-optical axis photoelectric sensor (S), comprising:
an emitter unit (1) including a plurality of emitter elements (11) that are aligned linearly;
a receiver unit (2) including a plurality of receiver elements (21) that are arranged to face the respective emitter elements (11);
a detection processing unit (16, 26) configured to determine, in a detection area (R) including a plurality of optical axes formed between the plurality of emitter elements (11) and the plurality of receiver elements (21), whether each of the optical axes is in an interrupted state after optical axis selection corresponding to one scan, and output a detection signal based on a result of the determination; and
a signal reception unit (30) configured to receive a first signal immediately before an object (60) that is movable within the detection area (R) enters the detection area (R), and receive a second signal immediately before the object (60) moves out of the detection area (R),
wherein the detection processing unit (16, 26) is configured to perform, when at least one of the plurality of optical axes is constantly interrupted by the object (60), floating blanking of outputting the detection signal upon determining that the number of optical axes in an interrupted state is greater than a preset maximum optical axis number, and blanking monitoring of outputting the detection signal upon determining that the number of optical axes in an interrupted state is smaller than a preset minimum optical axis number, and
the detection processing unit (16, 26) activates or deactivates the floating blanking and the blanking monitoring based on the first signal and the second signal received by the signal reception unit (30).

2. The multi-optical axis photoelectric sensor (S) according to claim 1, wherein
the detection processing unit (16, 26) activates the floating blanking when receiving the first signal, and activates the blanking monitoring when determining that the number of optical axes in an interrupted state is not less than the minimum optical axis number after the floating blanking is activated, deactivates the blanking monitoring after receiving the second signal, and further deactivates the floating blanking when determining that all the optical axes are in a light-entering state after receiving the second signal.

3. The multi-optical axis photoelectric sensor (S) according to claim 1, wherein
the detection processing unit (16, 26) constantly activates the floating blanking, and activates the blanking monitoring when determining that the number of optical axes in an interrupted state is not less than the minimum optical axis number after receiving the first signal, and deactivates the blanking monitoring after receiving the second signal.

4. A method for controlling a multi-optical axis photoelectric sensor (S) including an emitter unit (1) including a plurality of emitter elements (11) that are aligned linearly, a receiver unit (2) including a plurality of receiver elements (21) that are arranged to face the respective emitter elements (11), and a detection area (R) including a plurality of optical axes formed between the plurality of emitter elements (11) and the plurality of receiver elements (21),
the method comprising:
determining whether each of the optical axes is in an interrupted state after optical axis selection corresponding to one scan, and outputting a detection signal based on a result of the determination;
receiving a first signal immediately before an object (60) that is movable within the detection area (R) enters the detection area (R), and receiving a second signal immediately before the object (60) moves out of the detection area (R); and
activating or deactivating, when at least one of the plurality of optical axes is constantly interrupted by the object (60), floating blanking of outputting the detection signal upon determining that the number of optical axes in an interrupted state is greater than a preset maximum optical axis number and blanking monitoring of outputting the detection signal upon determining that the number of optical axes in an interrupted state is smaller than a preset minimum optical axis number based on the first signal and the second signal.

5. The method for controlling the multi-optical axis photoelectric sensor (S) according to claim 4, wherein
the step of activating or deactivating includes
activating the floating blanking when receiving the first signal, and activating the blanking monitoring when determining that the number of optical axes in an interrupted state is not less than the minimum optical axis number after activating the floating blanking, and
deactivating the blanking monitoring after receiving the second signal, and further deactivating the floating blanking when determining that all the optical axes are in a light-entering state after receiving the second signal.

6. The method for controlling the multi-optical axis photoelectric sensor (S) according to claim 4, wherein
the step of activating or deactivating includes activating the floating blanking constantly, and activating the blanking monitoring when determining that the number of optical axes in an interrupted state is not less than the minimum optical axis number after receiving the first signal, and deactivating the blanking monitoring after receiving the second signal.

* * * * *